(12) United States Patent
Tzeng

(10) Patent No.: US 9,077,247 B2
(45) Date of Patent: Jul. 7, 2015

(54) CIRCUIT FOR CONTROLLING A POWER SUPPLY

(71) Applicant: INFINNO TECHNOLOGY CORP., Hsinchu County (TW)

(72) Inventor: Ren-Huei Tzeng, Hsinchu County (TW)

(73) Assignee: Infinno Technology Corp., Hsinchu County (TW)

(*) Notice: Subject to any disclaimer, the term of this patent is extended or adjusted under 35 U.S.C. 154(b) by 384 days.

(21) Appl. No.: 13/650,396

(22) Filed: Oct. 12, 2012

(65) Prior Publication Data
US 2013/0100719 A1 Apr. 25, 2013

Related U.S. Application Data

(60) Provisional application No. 61/547,370, filed on Oct. 14, 2011.

(51) Int. Cl.
*H02H 3/087* (2006.01)
*H02M 1/32* (2007.01)
*H02M 3/335* (2006.01)

(52) U.S. Cl.
CPC ............ *H02M 1/32* (2013.01); *H02M 3/33553* (2013.01)

(58) Field of Classification Search
CPC ........... H02M 1/32; H02H 3/087; H02H 3/20; H02H 3/202; H02H 3/207; H02H 3/243
USPC ................ 363/50, 53, 21.05; 361/18, 90
See application file for complete search history.

(56) References Cited

U.S. PATENT DOCUMENTS

2010/0302814 A1* 12/2010 Lu et al. .............. 363/21.01

\* cited by examiner

*Primary Examiner* — Harry Behm
*Assistant Examiner* — Matthew Grubb
(74) *Attorney, Agent, or Firm* — Rosenberg, Klein & Lee

(57) ABSTRACT

A control circuit for controlling a power supply is revealed. The control circuit is used to generate a switching signal for switching the power supply. The control circuit has a detection terminal for detecting a status of the power supply. A first protection circuit is coupled to the detection terminal and to receive a first detection signal via the detection terminal, and the first protection generates a limit signal in response to the first detection signal, for limiting output of the power supply. A second protection circuit is coupled to the detection terminal and to receive a detection signal via thereto, and the second protection generates a protecting signal, for cutting off the output of the power supply, in response to the first detection signal. A phase dividing circuit is coupled to the detection terminal, the first protection circuit and the second protection circuit, and to generate the first and second detection signal in response to the level of the switching signal, for achieving that two independently adjusted protection circuit are detected by one pin of an integrated circuit (IC) to prevent the IC from increasing of the pin amount. It further reduces the occupied area of the IC.

8 Claims, 5 Drawing Sheets

CIRCUIT FOR CONTROLLING A POWER SUPPLY

REFERENCE TO RELATED APPLICATION

This Application is based on Provisional Patent Application Ser. No. 61/547,370, filed 14 Oct. 2011.

FIELD OF THE INVENTION

The present invention relates generally to a control circuit, and particularly to a control circuit for controlling a power supply.

BACKGROUND OF THE INVENTION

As the recent semiconductor technique of the integrated circuit (IC) in quick developing, recent electronic products are trended to be thin and light and small for attracting people. In contrast to the recent electronic products, each of the past electronic products has a power supply with larger volume and cumbersome weight. The power supply is a type of linear power supply which has an isolation transformer, a heat dissipating sheet and a cooling fan with cumbersome weight. However, the switching power supply can overcome these problems and can achieve the advantages of high efficiency, light weight and small volume. Nevertheless, the switching power supply is more complex than the linear power supply, so stronger knowledge based on designs of analog electronic, magnetic member, logic and control is required to plan the design of the switching power supply.

In the switching type architecture of the AC/DC conversion, the power supply is usually needed to prevent Bulk line voltage from the occurrence of over voltage, for generally concentrating on safety. In particular to protect inner components of some special application, maximum duty is also limited in response to the detection of the Bulk line voltage. Further, with the development of technology, more and more functions are integrated in one IC. The requirement of the IC with low pins is larger and larger as well. In general technique, the functions of bulk line over voltage and the maximum duty limited by detecting of the Bulk line voltage are made in different design with different applied occasions. Generally, when the IC requires the functions of bulk line over voltage and the maximum duty limitation, two detection terminals are needed to set in the IC for protections of over voltage and maximum duty limitation. Hence, the pin quantity of the IC will be increased, and the occupied area of the IC will further increased.

Thus, a novel control circuit for controlling the power supply is provided to overcome above problem. The novel control circuit will detect two independently adjusted protection circuits via one pin of the IC for preventing the IC from the increment of the pin quantity, and for further reducing the occupied area of the IC.

SUMMARY

An objective of the present invention is to provide a control circuit for controlling a power supply, which provides a phase dividing circuit coupled to a detection terminal. As well, first and second detection signals are generated upon levels of a switching signal for transferring to first and second protection circuits. Thereby, two independently adjusted protection circuits are detected by one pin of the IC for preventing the IC from the increment of pin quantity and for further reducing the occupied area of the IC.

The present invention provides a control circuit for controlling a power supply. The control circuit generates a switching signal for switching the power supply and has a detection terminal for detecting the status of the power supply. The control circuit comprises a first and a second protection circuit and a phase dividing circuit. The first protection circuit is coupled to the detection terminal and to receive a first detection signal via the detection terminal. As well, the first protection circuit generates a limit signal in response to the first detection signal to limit output of the power supply. The second protection circuit is coupled to the detection terminal and to receive a second detection signal via the detection signal. As well, the second protection circuit generates a protection signal in response to the second detection signal to cut off the output of the power supply. The phase dividing circuit is coupled to the detection terminal, the first and second protection circuits and to generate the first and second detection signals in response to levels of the switching signal. Thus, the present invention provides the phase dividing circuit coupled to the detection circuit, and generates the first and second detection signals in response to the output levels of the power supply, and the first and second detection signals are transferred to the first and second protection circuit for detecting two independently adjusted protection circuits via one pin of the IC. Thereby, the present invention can prevent the IC from the increment of the pin quantity, and can reduce the occupied area of the IC.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
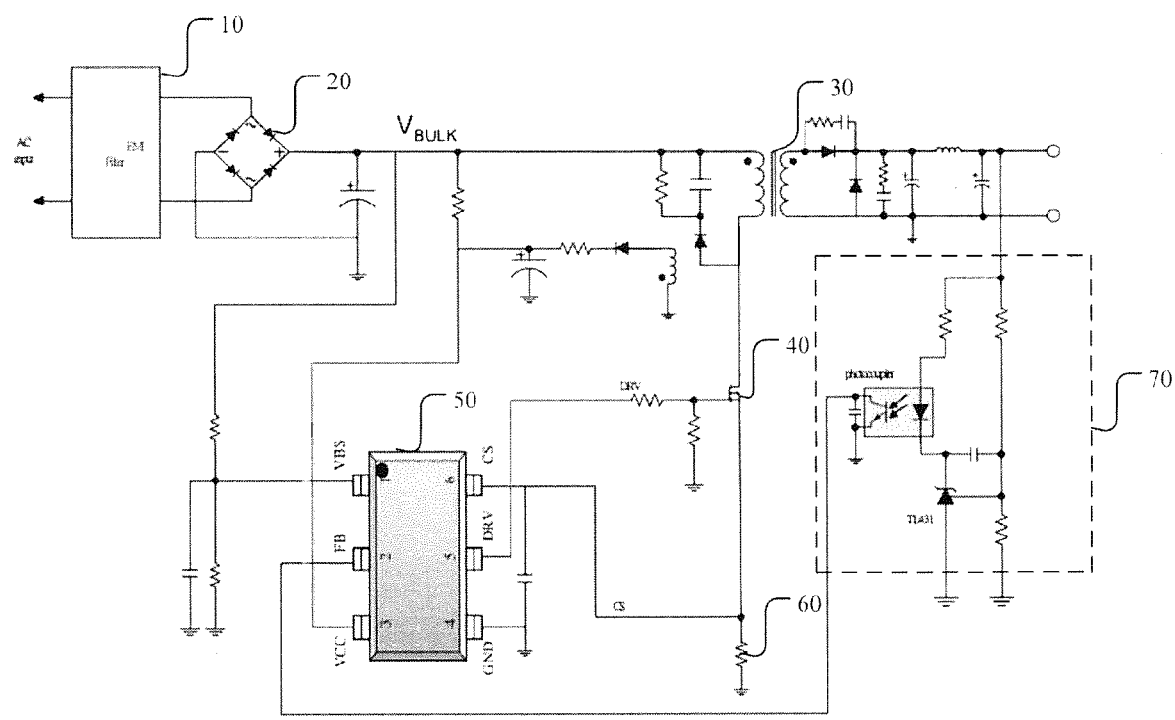
FIG. 1 shows a schematic diagram of a power supply according to an embodiment of the present invention.

FIG. 1 shows a schematic diagram of a power supply according to an embodiment of the present invention. As shown in the figure, the power supply according to this embodiment of the present invention is forward power supply and comprises a filtering circuit 10, a rectifying circuit 20, a transformer 30, a power switch 40, a control circuit 50, a sensing component 60 and a feedback circuit 70. The filter circuit 10 is coupled to receive an AC signal and to filter the AC signal, and the rectifying circuit 20 is coupled to rectify the filtered AC signal from the filtering circuit 10 for generating a Bulk line voltage $V_{BULK}$. The Bulk line voltage $V_{BULK}$, which is high level DC voltage at a primary side of the transformer 30, is lowered to be output voltage $V_{OUT}$ at a secondary side of the transformer 30 by the switching signal PWM switching the transformer 30 and the power switch 40.

The control circuit 50 is performed to be an important role in the power supply. The control circuit 50 is coupled to the power switch 40, the sensing component 60 and the feedback circuit 70. The control circuit 50 is coupled to a feedback terminal FB for receiving feedback signals of voltage and current to dynamically adjust the duty of the power switch 40, or coupled to a sensing terminal CS for receiving a sensing signal $V_{CS}$ generated from the sensing component 60 to dynamically adjust the duty of the power switch 40. Further, the control circuit 50 can be coupled to a detecting terminal VBS for receiving an input signal, which is the Bulk line voltage $V_{BULK}$, to dynamically adjust the duty of the power switch 40. Thereby, a steady output voltage $V_{OUT}$ can be obtained at a secondary side of the transformer 30.

Figure 2:
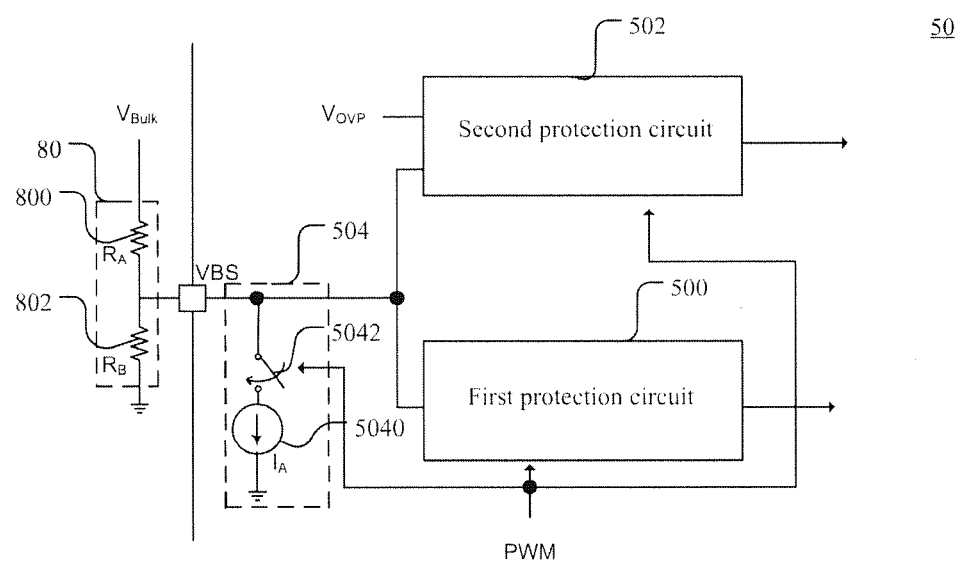
FIG. 2 shows a schematic diagram of a control circuit according to an embodiment of the present invention.

FIG. 2 shows a schematic diagram of a control circuit according to an embodiment of the present invention. As shown in the figure, the control circuit 50 according to the present invention is mainly used for receiving the input voltage, which is the Bulk line voltage $V_{BULK}$, through the detecting terminal VBS to generate two detection signals, and the two detection signals are transferring to two independently adjusted protection circuits for achieving that the two independently adjusted protection circuits can be detected by a pin of an integrated circuit. It can prevent the IC from the increment of pin quantity, and it further reduces the occupied area of the IC. The detailed how to arrive above objective by using the detection terminal VBS of the control circuit 50 as follow.

The control circuit 50 according to the present invention detects the status of the power supply through the detecting terminal VBS. As well, the power supply further comprises a voltage dividing circuit 80 coupled to the detecting terminal VBS of the control circuit 50 for dividing the input voltage, which is the Bulk line voltage $V_{BULK}$, to be a voltage dividing signal $V_B$ transferred to the detecting terminal VBS. It is provided for the control circuit 50 to detect the status of the power supply. Wherein, the voltage dividing circuit 80 comprises a first resistor 800 coupled to receive the input voltage and a second resistor 802 having a first terminal and a second terminal. The first terminal of the second resistor 802 is coupled to the first resistor 800 and the detecting terminal VBS, the second terminal of the second resistor 802 is coupled to ground. That is, the first resistor 800 and the second resistor 802 are connected in series to divide the input voltage for generating the voltage dividing signal $V_B$. The voltage dividing signal $V_B$ is transferred to the detecting terminal VBS, and it provides the control circuit 50 for detecting the status of the power supply via the detecting terminal VBS.

Furthermore, the control circuit 50 comprises a first protection circuit 500, a second protection circuit 502 and a phase dividing circuit 504. The first protection circuit 500 is coupled to the detecting terminal VBS and to receive a first detection signal through the detecting terminal VBS. The first protection circuit 500 generates a limit signal in response to the first detection signal to limit the output of the power supply. The second protection circuit 502 is also coupled to the detecting terminal VBS and to receive a second detection signal through the detecting terminal VBS. The second protection circuit 502 generates a protection signal in response to the second detection signal to cut off the output of the power supply.

The phase dividing circuit 504 is coupled to the detecting terminal VBS, the first protection circuit 500 and the second protection circuit 502. That is, the phase dividing circuit 504 has a first terminal and a second terminal. The first terminal of the phase dividing circuit 504 is coupled to the detecting terminal VBS, the first protection circuit 500 and the second protection circuit 502, and the second terminal of the phase dividing circuit 504 is coupled to the ground. The phase dividing circuit 504 generates the first detection signal and the second detection signal in response to the levels of the switching signal PWM. That is, the phase dividing circuit 504 generates the first detection signal while the switching signal PWM is held at high level state, and the first detection signal is transferred to the first protection circuit 500. In the meanwhile, the first protection circuit 500 also receives the switching signal PWM for enabling of the first protection circuit 500. In other words, the switching signal PWM would be transferred to the first protection circuit 500 and the phase dividing circuit 504. While the level of the switching signal PWM is held at high level, the phase dividing circuit 504 will generate the first detection signal, and the first protection circuit 500 will be enabled to receive the first detection signal as well. The first protection circuit 500 generates the limit signal in response to the first detection signal, for limiting the output of the power supply.

On the other hand, while the level of the switching signal PWM is held at low level, the phase dividing circuit 504 will generate the second detection signal, and the second detection signal is transferred to the second protection circuit 502. In the meanwhile, the second protection circuit 502 also receives the switching signal PWM for enabling of the second protection circuit due to the switching signal PWM held at low level. It causes that the second protection circuit 502 generates a protection signal in response to the second detection signal, for cutting off the output of the power supply. Thus, the operation of the phase dividing circuit 504 according to the present invention is determined by different levels of the switching signal PWM. That is to say, a time dividing technique of the switching signal PWM held at high level and low level arrives that two independently adjusted protection circuits are detected by one pin of the IC. It will prevent the IC from increasing the pin quantity of the IC, and it further reduces the occupied area of the IC.

Figure 3:
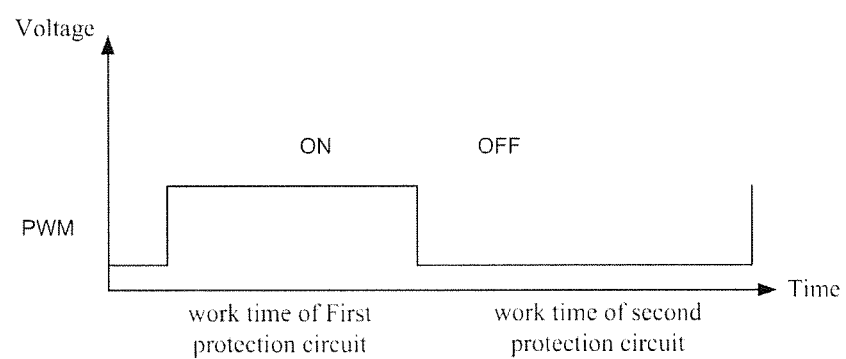
FIG. 3 shows a waveform diagram of a switching signal outputted from the control circuit according to the present invention.

Continuously, in the control circuit 50 according to this embodiment of the present invention, the first protection circuit 500 is called as a Max duty limiter. The second protection circuit 502 is called as an over-voltage protection circuit. The phase dividing circuit 504 comprises a current source 5040 and switch 5042. The current source 5040 provides a current, and the switch 5042 is coupled between the detecting terminal VBS and the current source 5040. Thereby, the switch 5042 is switched by the levels of the switching signal PWM to be turned on/off. In the embodiment, the switch 40 is opened namely as turned off when the switching signal PWM is held at high level, and then the voltage dividing signal $V_B$ from the voltage dividing circuit 80 is regarded as a first detection signal $V_{BS1}$. The first detection signal $V_{BS1}$ is transferred to the first protection circuit 500, thereby, the first protection circuit 500 obtains the max duty in response to the first detection signal $V_{BS1}$. When the level of the switching signal PWM is low level (as shown in FIG. 3), the switch 40 is closed namely turned on, and then the phase dividing circuit 504 generates the second detection signal in response to the voltage dividing signal $V_B$ and the current generated from the current source 5040. That is, the phase dividing circuit 504 adds the voltage corresponding to the voltage dividing signal $V_B$ and the voltage corresponding to the current generated from the current source 5040 to generate the second detection signal $V_{BS2}$. The second detection signal $V_{BS2}$ is transferred to the second protection circuit 502. Then, according to a reference signal $V_{OVP}$ pre-determined by circuit design of the control circuit 50 and the second detection signal $V_{BS2}$, the second protection circuit 502 judges whether the input signal is at over-voltage state or not. That is, the second protection circuit 502 compares the second detection signal $V_{BS2}$ with the reference signal $V_{OVP}$, and the second protection circuit 502 obtains that the input signal is at over-voltage state while the second detection signal $V_{BS2}$ is greater than the reference signal $V_{OVP}$. Thereby, the output of the power supply is cut off to protect the power supply.

Thus, by the phase dividing circuit 504 coupled to the detecting terminal VBS, and by the first and second detection signals respectively generated in response to the levels of the switching signal PWM and respectively transferred to the first and the second protection circuits 500, 502, the present invention reaches the objective that the two dependently adjusted protection circuits are detected by using one pin of the IC. Thereby, it will avoid the IC increasing the pin quantity and will further prompt the occupied area of the IC to be reduced.

Figure 4:
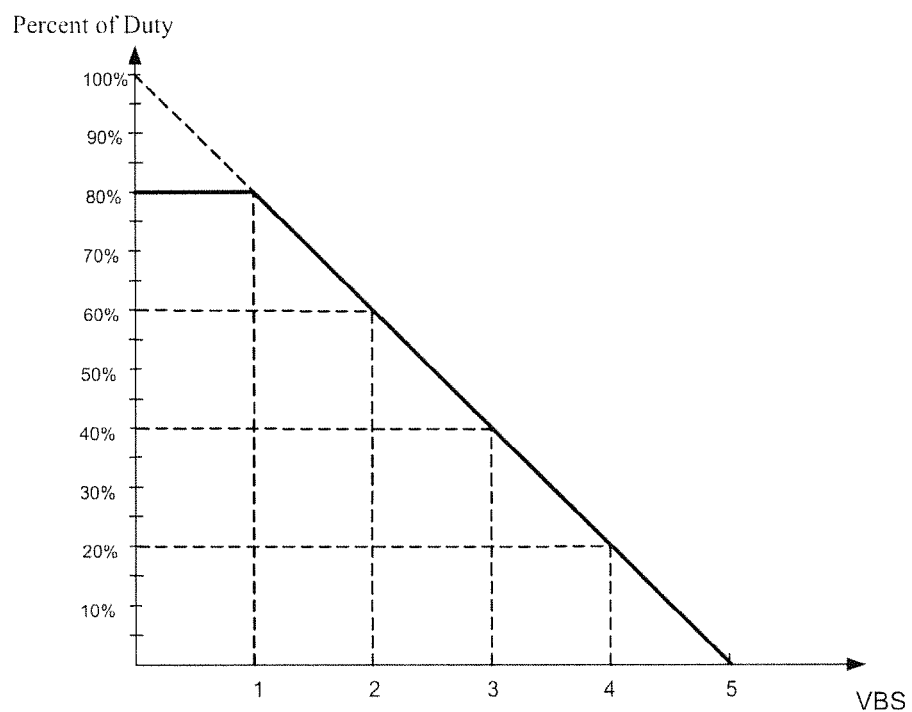
FIG. 4 shows a waveform diagram of detection signal and maximum duty according to the present invention.

FIG. 4 shows a waveform diagram of detection signal and maximum duty according to the present invention. As shown in figure, when the max duty limitation and over-voltage protection are performed by the first protection circuit 500 and the second protection circuit 502, it is necessary that the first and second detection signals $V_{BS1}$, $V_{BS2}$ are set by the percent of the max duty limitation and the magnitude of the reference signal $V_{OVP}$. The magnitude of the first and second detection signals $V_{BS1}$, $V_{BS2}$ is determined by the first resistor 800 and the second resistor 802 of the voltage dividing circuit 80. Therefore, the first resistor 800 and the second resistor 802 according to the present invention can be designed upon the requirement of the percent of the max duty limitation and the magnitude of the reference signal $V_{OVP}$. The resistor 800, 802 are given as follow equations, $$\frac{(V_{BULK} - V_{BS1})}{R_A} - \frac{V_{BS1}}{R_B} = 0 \quad (1)$$

$$\frac{(V_{BULK} - V_{BS2})}{R_A} - \frac{V_{BS2}}{R_B} = IA. \quad (2)$$

Where, $R_A$ and $R_B$ are the first resistor 800 and the second resistor 802, respectively. IA is the current of the current source 5040. For example, if it is needed to design a circuit, the input voltage is set at 400V, the max duty is set at 20%, and the over-voltage protection is occurred while the input voltage is held at 425 V. As well, the current IA of the current source 5040 is 10 μA, and the level of the second detection signal is 3 V. As shown in FIG. 4, it can be understood that the level of the first detection signal corresponding to the max duty at 20% is 4 V. Hence, according to equation (1) and (2), the resistance of the first resistor 800 is 12.5 MΩ, and the resistance of the second resistor 802 is 126.3KΩ.

Figure 5:
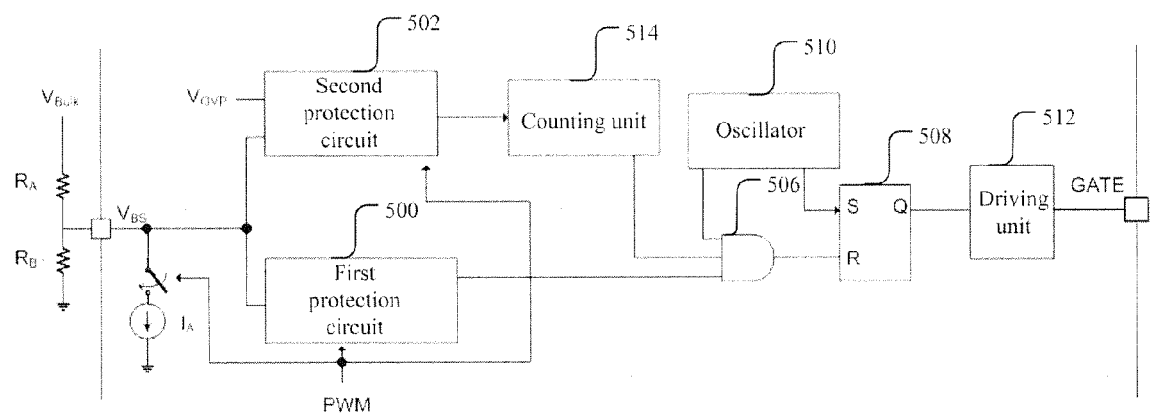
FIG. 5 shows a schematic diagram of a control circuit according to another embodiment of the present invention.

FIG. 5 shows a schematic diagram of a control circuit according to another embodiment of the present invention. As shown in figure, the control circuit 50 according to the present invention further comprises a logic unit 506. a flip-flop 508, a oscillator 510, a driving unit 512 and a counting unit 514. The logic unit 506 is coupled to the first and second protection circuits 500, 502 and to generate a reset signal in response to the limit signal and the protection signal. The flip-flop 508 is coupled to the logic unit 506 and to generate the switching signal PWM in response to the reset signal, in which the switching signal PWM is used to switch the power supply. In order to enhance the magnitude of the output signal from the flip-flop 508, the driving unit 512 is additionally coupled to the flip-flop 508. The switching signal PWM is generated further in response to the output of the flip-flop 508 to switch the power switch 40 of the power supply.

The oscillator 510 is used to provide a oscillating signal which is transferred to the logic unit 506 and the flip-flop 508, where, the oscillating signal transferred from the oscillator 510 to the logic unit 506 is able to control the max percent of the max duty that the first protection circuit 500 can output. The counting unit 514 is coupled to the second protection circuit 502 and to generate a counting signal in response to the second protection signal, in which the counting signal is transferred to the logic unit 506 to cut off the output of the power supply. The counting unit 514 counts the protection signal to determine whether the input voltage is at the over-voltage state or not. That is, the on period of the second protection signal outputted from the second protection circuit 502 is exceed than a predetermined period, the counting unit 514 will generate the counting signal and output it to determine the input voltage held at the over-voltage state.

to sum up, the control circuit for controlling the power supply according to the present invention generates a switching signal to switch the power supply and has a detecting terminal to detect the status of the power supply. A first protection circuit of the control circuit is coupled to the detecting terminal and to receive a first detection signal via the detecting terminal, thereby, the first protection circuit generates a limit signal in response to the first detection signal to limit the output of the power supply. A second protection circuit of the control circuit is coupled to the detecting terminal and to receive a second detection signal via the detecting terminal, thereby, the second protection circuit generates a protection signal in response to the second detection signal to cut off the output of the power supply. A phase dividing circuit is coupled to the detecting terminal, the first and second protection circuits and to generate the first and second detection signals in response to the levels of the switching signal, for achieving that two independently adjusted protection circuit are detected by using a pin of the IC. It will prevent the IC from increasing the pin quantity and further reduce the occupied area of the IC.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature or spirit described in the claims of the present invention are included in the appended claims of the present invention.

The invention claimed is:

1. A control circuit for controlling a power supply, for generating a switching signal to switch the power supply, the control circuit having a detection terminal for detecting the status of the power supply, the control circuit comprising:
a first protection circuit, coupled to the detection terminal, receiving a first detection signal via the detection terminal, the first protection circuit generating a limit signal in response to the first detection signal to limit output of the power supply;
a second protection circuit, coupled to the detection terminal, receiving a second detection signal via the detection terminal, the second protection circuit generating a protection signal in response to the second detection signal to cut off the output of the power supply;
a phase dividing circuit, coupled to the detection terminal, the first protection circuit and the second protection circuit, the phase dividing circuit generating the first detection signal and the second detection signal in response to the level of the switching signal;
a logic unit, coupled to the first protection circuit and the second protection circuit, generating a reset signal in response to the limit signal and the protection signal;

a flip-flop, coupled to the logic unit, generating the switching signal for switching the power supply in response to the reset signal; and a counting unit, coupled to the second protection circuit, generating a counting signal in response to the second protection signal and transferring the counting signal to the logic unit.

2. The control circuit as claimed in claim 1, wherein the first protection circuit and the second protection circuit are performed in response to different levels of the switching signal.

3. The control circuit as claimed in claim 1, wherein the phase dividing circuit comprise:

a current source, providing a current; and a switch, coupled between the detection terminal and the current source, turned on/off in response to the level of the switching signal, wherein the first detection signal is generated when the switch is turned off, the second detection signal is generated in response to the current when the switch is turned on.

4. The control circuit as claimed in claim 1, wherein the detection terminal is further coupled to a voltage dividing circuit which divides an input voltage to provide for the first protection circuit receiving the first detection signal or for the second protection circuit receiving the second detection signal.

5. The control circuit as claimed in claim 4, wherein the voltage dividing circuit comprise:

a first resistor, receiving the input voltage; and a second resistor, having a first terminal and a second terminal, the first terminal coupled to the first resistor and the detection terminal, the second terminal coupled to a ground, the first resistor and the second resistor dividing the input voltage to provide for the first protection circuit receiving the first detection signal or for the second protection circuit receiving the second detection signal.

6. The control circuit as claimed in claim 1, further comprising:

an oscillator, generating a oscillating signal, and transferring the oscillating signal to the logic unit and the flip-flop.

7. The control circuit as claimed in claim 1, further comprising:

a driving unit, coupled to the flip-flop, and generating the switching signal for switching the power supply in response to the output of the flip-flop.

8. The control circuit as claimed in claim 1, wherein the first protection circuit is a maximum duty limit circuit, and the second protection circuit is an over-voltage protection circuit.

* * * * *